United States Patent
McHale et al.

[11] Patent Number: 4,513,624
[45] Date of Patent: Apr. 30, 1985

[54] CAPACITIVELY-COUPLED MAGNETIC FLOWMETER

[75] Inventors: Edward J. McHale, Medfield, Mass.; Yousif A. Hussain, Horley, England; Michael L. Sanderson, Stockport, England; John Hemp, Cranfield, England

[73] Assignee: The Foxboro Company, Foxboro, Mass.

[21] Appl. No.: 459,567

[22] Filed: Jan. 20, 1983

[51] Int. Cl.$^3$ ............................................... G01F 1/58
[52] U.S. Cl. ................................................. 73/861.12
[58] Field of Search ........... 73/861.12, 861.14, 861.16, 73/861.17

[56] References Cited

U.S. PATENT DOCUMENTS

| | | | |
|---|---|---|---|
| 3,178,941 | 4/1965 | Berry | 73/861.14 |
| 3,433,066 | 3/1969 | Bailey | 73/861.16 |
| 3,491,593 | 1/1970 | Bailey | 73/861.16 |
| 3,999,443 | 12/1976 | Appel et al. | 73/861.17 |
| 4,147,058 | 4/1979 | Matsushita | 73/861.12 |
| 4,157,035 | 6/1979 | Doll et al. | 73/861.17 |

Primary Examiner—Charles A. Ruehl
Attorney, Agent, or Firm—Jack H. Wu; Terrence (Terry) Martin; Andrew T. Karnakis

[57] ABSTRACT

A magnetic flowmeter of the capacitively-coupled type includes low-input impedance detection circuitry which responds to a flow induced current signal that is related to the voltage induced at the electrodes by the intersection of the flowing fluid and a time varying magnetic field. An on-line measure of the electrode capacitance that is non-interactive with the flow induced current signal is accomplished by creating a voltage difference between the process fluid and the electrodes which causes a capacitance-related current to flow from the electrodes proportional to the value of the electrode capacitance as well as the rate of change of the magnetic field. In one embodiment the primary element and the detection circuitry are referenced to a different potential than that of the process fluid and the adjacent piping of the flow system. Thus a direct, on-line measure of this capacitance can be attained in a manner that essentially eliminates stray leakage currents and that foregoes the needs for special shielding requirements such as localized, internal shields around the imbedded electrodes.

19 Claims, 15 Drawing Figures

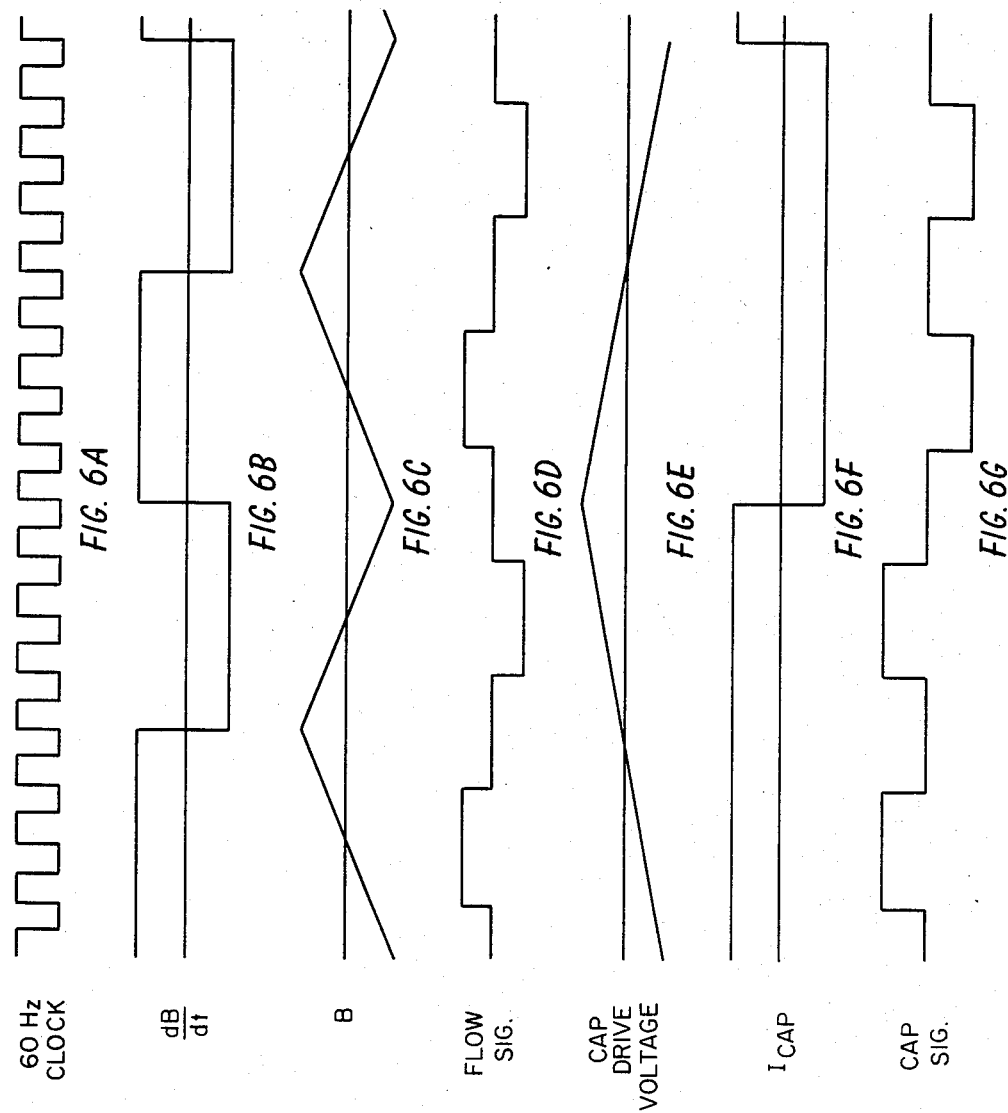

CAPACITIVELY-COUPLED MAGNETIC FLOWMETER

FIELD OF THE INVENTION

This invention relates generally to magnetic flowmeters, and in particular to capacitance type magnetic flowmeters wherein the measurement electrodes do not contact the fluid whose flow rate is to be measured.

BACKGROUND OF THE INVENTION

Magnetic flowmeters adapted to measure volumetric flow rates of conductive fluids by capacitive signal pickup means have been devised for some time. In such meters the electrodes are electrically insulated from the fluid to be measured by a dielectric liner. Thus a capacitor is formed between the conductive fluid and each of the electrodes. The advantages of using "non-wetted" electrodes in handling troublesome process fluids in a capacitance type instrument (i.e., corrosive fluids, "dirty" fluids which tend to coat or foul the electrodes, and low conductivity fluids, to name a few) are also well known to those of skill in the art.

Examples of prior patent art in this area include U.S. Pat. No. 3,839,912 which discloses a magnetic flowmeter system with measuring electrodes that are capacitively coupled to the fluid. The flow tube of the system is adapted to receive an insertable probe section formed of dielectric material having an integral electrode assembly. Positioned within this assembly and connected to the measuring electrode is a high-impedance amplifier for receiving the flow induced voltages. These flow related signals result from the interaction of an a-c magnetic field established across the flow tube and the flowing conductive fluid that induces an a-c voltage at the electrodes through the capacitive coupling with the fluid. The input impedance of the amplifier is kept extremely high so that the flow induced voltage may be suitably amplified by the amplifier to provide an output signal substantially proportional to the flow rate.

U.S. Pat. No. 3,999,443 discloses another variation of a capacitance type magnetic flowmeter system wherein the measuring electrodes are imbedded within the dielectric liner of a flow tube mounted within the flow stream. This disclosure is primarily concerned with minimizing spurious voltages produced during instrument operation, i.e., stray capacitance-coupled voltages and induced loop voltages in the input leads. As taught in this patent, spurious voltages from the first source are minimized by a combination of electrostatic shielding and low-frequency excitation of the magnetic field, while induced loop voltages are taken into account by varying the magnetic field in accordance with a square-wave excitation. Thus according to the disclosure a period exists in the measurement cycle where the rate of change of the magnetic field is zero thereby minimizing undesired in-phase and quadrature voltage components. Just as with the aforementioned U.S. Pat. No. 3,839,912, this patent teaches that in order to obtain an output of desired accuracy the electrodes are connected to a high-impedance amplifier.

Because the disclosures of the prior art are all concerned with processing an extremely high-impedance measurement voltage at the electrodes, with corresponding electrode connection to a high-impedance amplifier circuit, certain signal handling difficulties are encountered. For example, such high-impedance signals are sensitive to cable characteristics and stray capacitance thereby requiring special attention to be paid to shielding. Furthermore, magnetic flowmeter systems that utilize high-impedance measurement signals generally involve high-frequency/high-power operation to produce an output indicative of flow rate. Aside from being energy inefficient, this mode of operation involves the use of critically-tuned circuits with attendant increase in complexity and cost.

Attempts to overcome certain of these difficulties can produce other difficulties. For example, as discussed in the aforementioned U.S. Pat. No. 3,999,443, spurious voltages produced by stray capacitance leakeage may be minimized in part by low-frequency excitation of the flowmeter drive system. However, this has the effect of further increasing the capacitive impedance between the electrodes and the process fluid resulting in further power drain and an actual increase in susceptibility to stray leakage.

SUMMARY OF THE INVENTION

The present invention overcomes the foregoing difficulties associated with capacitively coupled magnetic flowmeters by providing a system in which a signal current is detected at the electrodes by a low-impedance current-to-voltage converter. In a preferred embodiment, the detection circuitry responds to a square wave current signal produced by a triangular wave magnetic field which is driven by the field coils. Provisions are included in the detection circuitry for performing a direct, on-line measurement of the electrode capacitance concurrently with the flow signal current. By creating a small voltage difference between the process fluid and the electrodes, the capacitance (and ultimately the flow signal) can be measured in a way that essentially eliminates stray leakage currents and concomitantly simplifies shielding considerations for the overall measurement system.

Other aspects and advantages of the present invention will become apparent from the following detailed description taken in conjunction with the drawings.

DESCRIPTION OF THE DRAWINGS

FIGS. 6A–G are a series of wave forms for the preferred embodiment;

DESCRIPTION OF THE PREFERRED EMBODIMENT

Figure 1:
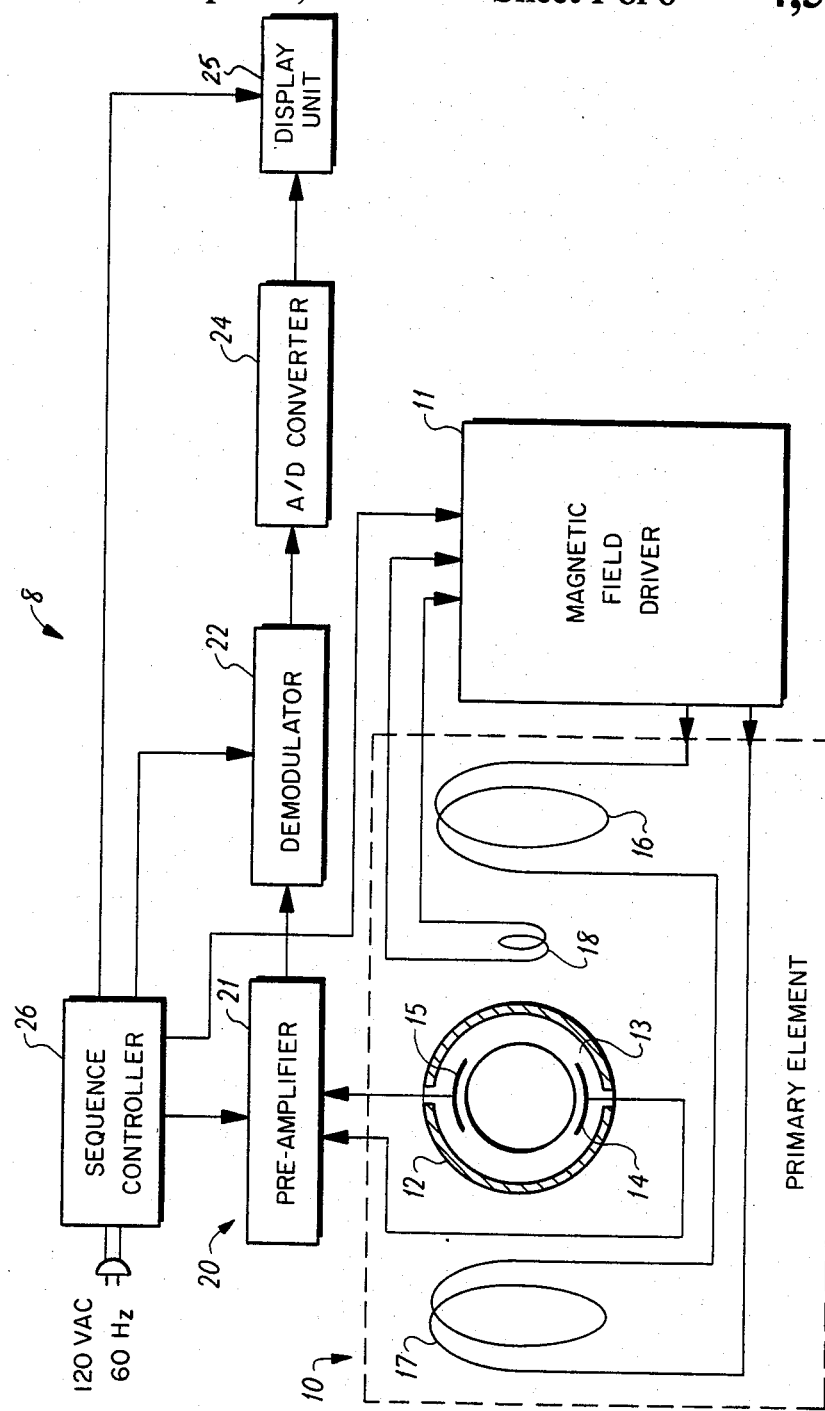
FIG. 1 is a block diagram of a magnetic flowmeter measurement system constructed in accordance with the present invention.

FIG. 1 is a block diagram of a magnetic flowmeter system 8 built in accordance with the preferred embodiment of the invention which includes a primary measurement element 10 with an associated magnetic field driver circuit 11 and electronic circuitry for detecting the flow signal and converting it to a usable output. Included as part of the primary element is a flow tube 12 adapted to be inserted into a piping system carrying fluid whose rate of flow is to be determined, a dielectric liner 13 coating the interior of the flow tube, and a pair of measurement electrodes 14, 15 imbedded within the liner so as not to be in contact with the process fluid. Mounted on the outside of the flow tube are a pair of field coils 16, 17 positioned transversely with respect to the measurement electrodes with an iron core 19 (see FIG. 2) linking the two field coils. A flux pickup coil 18 is aligned with the field coil 16 to encompass the flux passing through the flow tube. The magnetic field driver circuit is connected directly to the field coils and provides the field excitation energy.

The detection circuitry 20 consists of a pre-amplifier 21 connected to the electrodes 14, 15, a demodulator 22 receiving the amplified measurement signal, an analog-to-digital converter 24 which supplies to a display unit 25 a digital output signal that is representative of the flow signal. Also included as part of the signal processing electronics is a sequence controller 26 that provides the necessary timing and wave forms to operate the system.

Figure 2:
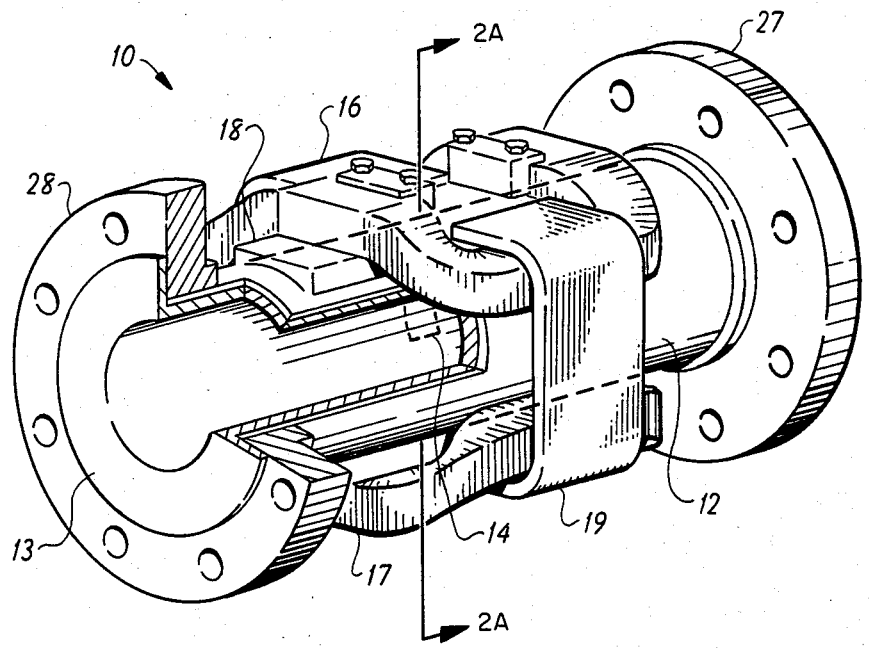
FIG. 2 is a perspective view, partially cut away, showing the details of a magnetic flowmeter primary element used in the preferred embodiment.

FIG. 2 provides in perspective view details of the magnetic flowmeter primary element 10. The flow tube 12 terminates in respective flanged end connections 27, 28 that facilitate mounting within a piping system of the type having conducting contacts with the fluid that are located within industrial process plants. The flanged end connections also serve as a convenient anchor point for the dielectric liner 13. The measurement electrodes 14, 15 imbedded within the liner (see also FIG. 2A) are positioned at right angles to the longitudinal flow axis of the flow tube. Additionally these electrodes are of relatively large surface area to more effectively sense the flow induced signals. Although not shown for the sake of clarity, a field cover surrounds the flow tube to protect the field coils 16, 17 which are mounted atop the flow tube from the often hostile process environment. Within the central portion of the top (as viewed in FIG. 2) field coil 16 and within the flux field established by the coils, the flux pickup coil 18 is similarly mounted on the flow tube. This coil like the field coils is thus perpendicular both to the flow axis and the measurement electrodes. It will be appreciated that this arrangement of measurement electrodes and coils will in response to the flow of a conductive fluid through the flow tube generate a voltage signal that is capacitively coupled to the detection circuitry 20 by the positioning of the dielectric liner between the process fluid and the electrodes.

Figure 3:
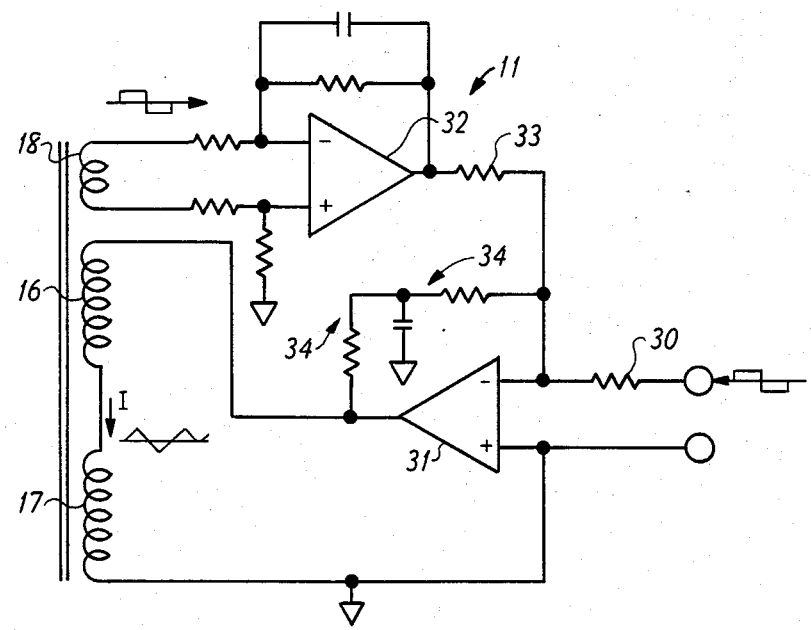
FIG. 3 is a schematic diagram of a magnetic field driver circuit used in the embodiment of FIG. 1.

Turning now to the operation of the magnetic field excitation portion of the measurement system, particular reference should be made to FIGS. 1 and 3 and the wave forms shown in FIGS. 6A-6C. The sequence controller 26, which employs digital counters and other well known circuitry, generates a train of square waves at frequencies that are sub-multiples of the 60 Hz a-c line frequency. In particular, a 7.5 Hz square wave voltage generated by the sequence controller and serving as the primary system clock is supplied after passing through a dropping resistor 30 to the inverting terminal of a high gain operational amplifier 31. The amplifier is configured such that the voltage at the inverting terminal is driven to essentially zero volts by a feedback network composed of the flux pickup coil 18, a buffer amplifier 32 and an output resistor 33. The capacitor and resistor network 34 around the operational amplifier 31 offsets long-term drift effects.

The operational amplifier 31 and associated feedback circuitry compares the voltage sensed by the flux pickup coil 18 with the input voltage from the sequence controller 26, and thus the voltage on the flux coil is forced to track the square wave input from the sequence controller. Since the flux coil induced voltage is a square wave that is proportional to the rate of change of the magnetic field (dB/dt) passing through the flow tube, the output current of the amplifier 31 (i.e., the magnetic field current) that energizes the field coils 16, 17 to produce a corresponding magnetic field will necessarily be a triangular wave form with a frequency of 7.5 Hz. This relationship is depicted by the wave forms of FIGS. 6A, 6B and 6C. Details of the operation and advantages of providing a separate reference coil to sense a time varying magnetic flux are given in U.S. Pat. No. 3,433,066.

When the magnetic field coils 16, 17 are energized by the triangular current wave, the lines of flux transversely extending through the flow tube 12 interact with the flowing fluid such that a voltage signal is induced proportional to the velocity of the flowing fluid that is detected at the measurement electrodes 14, 15. However, unlike conventional capacitively coupled magnetic flowmeters which employ high-impedance amplifier circuitry to measure the voltage induced at the electrodes, an important aspect of the present invention involves the measurement of a current signal proportional to the rate of change of the induced voltage signal produced by the electrodes. This is accomplished by the preamplifier/demodulator circuit shown in detail in FIG. 4 which operates as a low-impedance current-to-voltage converter.

Considering the operation of the detection circuitry 20 in further detail, it will be recalled that for a capacitively coupled magnetic flowmeter the amount of charge (Q) stored at an electrode is given by:

$$Q = CE$$

where, C is the electrode capacitance; and E is the flow induced voltage.

Since the flow voltage is a function of the velocity of the fluid (v), the diameter of the flow tube (D) and the magnetic field intensity (B), the expression above may be written as follows:

$$Q \propto CvDB$$

Differentiating with respect to time (and assuming the time rate of change of both the fluid velocity and the electrode capacitance over the sampling period is negligible) yields the following expression for the flow signal current—$i_F$:

$$i_F = (dQ/dt) \propto CvD(dB/dt)$$

Because the magnetic field is established by a triangular drive current (FIG. 6B), the time rate of change of the magnetic field (dB/dt) and necessarily the flow signal current will be a square wave.

Since the flow signal current and the time rate of change of the magnetic field are measurable quantities while the flow tube diameter is a constant, in order to determine the fluid velocity the electrode capacitance must be known. This capacitance measurement can be taken into account in various ways. For example, the capacitance attributed to having the measurement electrodes buried in the liner can be initially measured during manufacture and assumed to remain constant under process flow conditions. However, this approach has the drawback of not taking into account changes in capacitance due to temperature effects and changes in liner thickness either due to fouling or wear. It is also possible to make the initial capacitance measurement and provide temperature compensation by comparing the dielectric of the liner material at measured temperature to the dielectric at a reference temperature (e.g., 25° C.). In addition to being insensitive to capacitance changes due to variations in liner thickness, this approach requires complicated circuitry and even the possible addition of a microprocessor to the system which has stored the various dielectric values plotted over the anticipated temperature range of the flowmeter. All of this significantly adds complexities and costs without still providing an accurate measure of electrode capacitance.

In accordance with another important aspect of the present invention, electrode capacitance is measured on-line, preferably at the same time the flow signal current measurement is being made. The term "on-line measurement" is to be construed in its broadest sense to include an attendant measure of the electrode capacitance while the flowmeter system is operational with fluid flowing therethrough. Significantly, the concurrent capacitance and flow signal measurement is attained without any interference between the two and, importantly, in a manner that makes the overall measurement system insensitive to stray capacitance and other leakage voltages. The two measurements involved are the above described flow signal current (i.e., proportional to flow velocity, the rate of change of the magnetic field and electrode capacitance) and the measurement of a second current proportional to the same electrode capacitance and a generated rate of change of voltage that is controlled to be proportional to the rate of change of the magnetic field. The ratio of these two measured currents yields an output signal indicative of the flow velocity that is independent of the rate of change of the magnetic field and the electrode capacitance.

Figure 5:
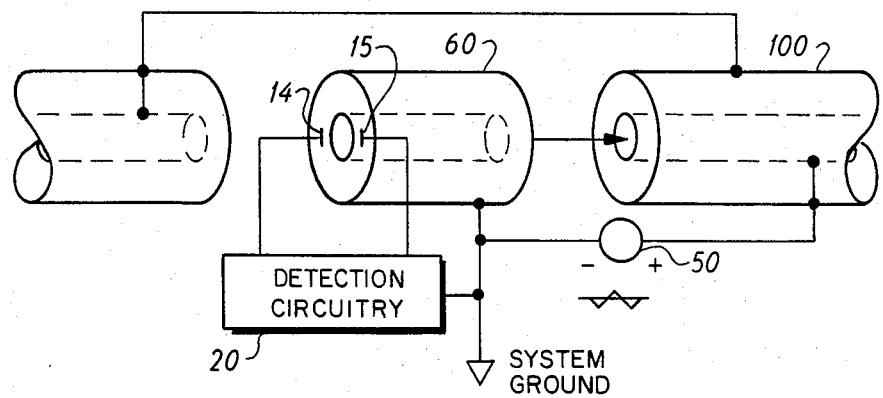
FIG. 5 is a block diagram illustrating the manner in which the fluid piping system is connected to the flow tube and detection circuitry for measuring electrode capacitance in the embodiment.
Figure 4:
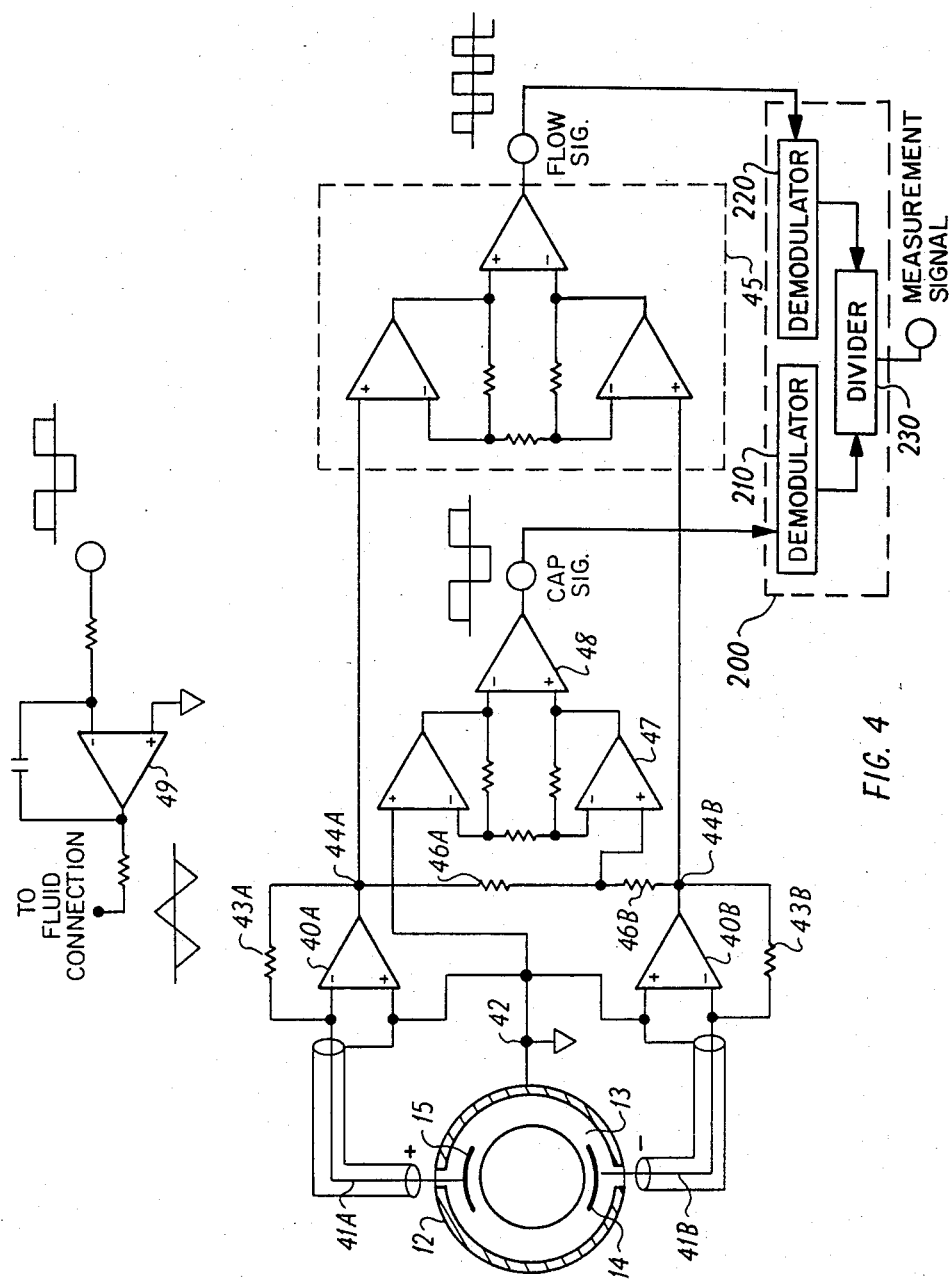
FIG. 4 is a schematic diagram of a flow signal preamplifier and demodulator portion of the detection circuitry for the embodiment.

Referring specifically to FIGS. 4 and 5, a pair of operational amplifiers 40A, 40B connected in a differential current-sensing mode constitute the low-impedance pre-amplifier 21 of the detection circuitry 20. For the embodiment being described, the flow tube 12 surrounding the liner 13 and the measurement electrodes 14, 15 is stainless steel and thus forms an electrically conducting shell 60 which is connected directly to system ground at node 42. The shields of input leads 41A, 41B of the amplifiers 40A, 40B are also connected to system ground at node 42. The circuit network comprised of the amplifiers 40A, 40B and their respective feedback resistors 43A, 43B hold the input leads 41A, 41B to essentially the same voltage as system ground, thereby clamping the voltage at the measurement electrodes 14, 15 at about zero volts. To make the on-line capacitance measurement, as will be more fully explained presently, this system ground is not connected electrically to the adjacent piping system and hence to the process fluid. Upon energization of the magnetic field, a signal current proportional to the rate of change of the induced voltage in the form of a 7.5 Hz square wave thus flows from the measurement electrodes through the respective feedback resistors 43A, 43B of the amplifiers 40A, 40B. This produces a corresponding voltage at nodes 44A, 44B which is in turn fed to a differential amplifier 45 to produce an output signal voltage essentially representative of the flow velocity. FIG. 6D shows this wave form which has been gated by timing signals from the sequence controller 26 to permit sampling of the current signal about the midpoint of the flow signal measurement cycle.

To concurrently measure electrode capacitance and still keep the measurement electrodes 14, 15 near ground (i.e., at zero volts potential) so as to avoid stray leakage problems and to forego the need for localized, internal shields about the electrodes, the arrangement of FIG. 5 is used. As schematically depicted, a voltage source 50 is interposed between the system ground of the conducting shell 60 and the conducting fluid-contact portion of the adjacent flow pipe 100. For illustrative purposes the flow tube and adjacent flow pipe are shown in exploded view without the corresponding flanged ends. When joined in an actual flowmetering system, the rubber gaskets (not shown) that seal the connection between the flow tube and adjacent flow pipe provide the necessary electrical isolation to sustain the voltage differential between the two.

Referring once again to FIG. 4, the voltage differential between system ground and the process fluid is maintained by injecting through an integrating amplifier 49 a square wave voltage from the sequence controller 26 at one-half the frequency of the flow signal square wave voltage, i.e., 3.75 Hz. (See FIG. 6E.) This produces a triangle wave voltage of corresponding frequency between the two grounds which causes a 3.75 Hz square wave current proportional to the value of the capacitance presented by the measurement electrodes 14, 15 to flow from each electrode to the nodes 44A, 44B. Thus, the output of both input amplifiers (nodes 44A, 44B) contains two composite wave forms—that is two square wave voltages, one at 3.75 Hz corresponding to the current flowing from the electrodes for measuring the capacitance thereof and one at twice that frequency corresponding to the induced flow signal. As evidenced from the connection of the amplifiers and the polarity of the electrodes, the various voltages as shown by the wave forms of FIGS. 6A–G are noninteractive and may be effectively separated from one another to produce the desired outputs. For example, the 7.5 Hz flow signal voltages cancel from the composite after being dropped across equal-valued summing resistors 46A, 46B. Then a summing amplifier 47 receives the 3.75 Hz voltage to yield at the output of a differential amplifier 48 a signal primarily indicative of the electrode capacitance. Similarly tracing the signal flow from the measurement electrodes though the amplifier network 45 reveals that the capacitance-measuring voltage signal is canceled from the composite to yield a flow related signal at the output of the amplifier 45.

Both the capacitance and flow signals are fed to other circuitry (200) that simply takes the ratio of the magnitude of these two square-wave voltages to yield a measurement signal proportional to the flow velocity. As further explanation, circuitry 200 includes conventional dimodulators 210 and 220 which receive respectively the two capacitance and flow signals and generate two corresponding level signals having amplitudes equal to the magnitudes of the square-wave voltages of the capacitance and flow signals. A conventional divider 230 produces the measurement signal by taking the ratio of the two level signals. The measurement signal may be utilized in a variety of ways; for example, it can be converted to a corresponding current signal to produce a 4-20 mA control signal for an on-line controller. Or, as depicted in FIG. 1, the measurement signal may undergo digital conversion (e.g., by a voltage-to-frequency converter) to provide a suitable signal for indication on the display unit 25.

Alternate Embodiments

As is evident from the preceding, there has been described a magnetic flowmeter system that is simple in construction and operation which achieves the key facets of the invention. However, alternative variations, particularly in the area of flow tube design, may be made. Although the variations to be described below are desirable in certain instances involving non-operational considerations such as safety, ease of installation, handling, mechanical strengthening and/or manufacturing economics, it should be emphasized that they have no influence on the electrical operation of the system as clearly illustrated in the preferred embodiment.

Figure 2A:
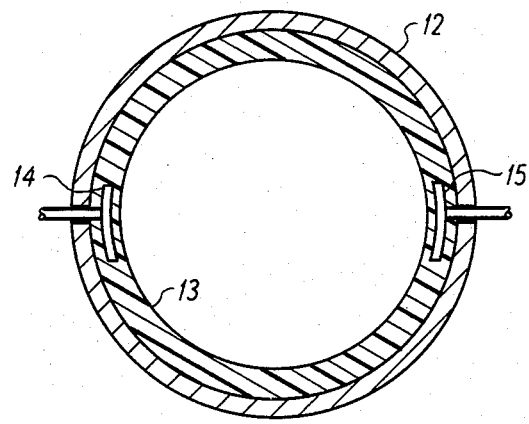
FIG. 2A is a detailed sectional view of the flow tube portion of the primary element showing electrode configuration for the embodiment.
Figure 7:
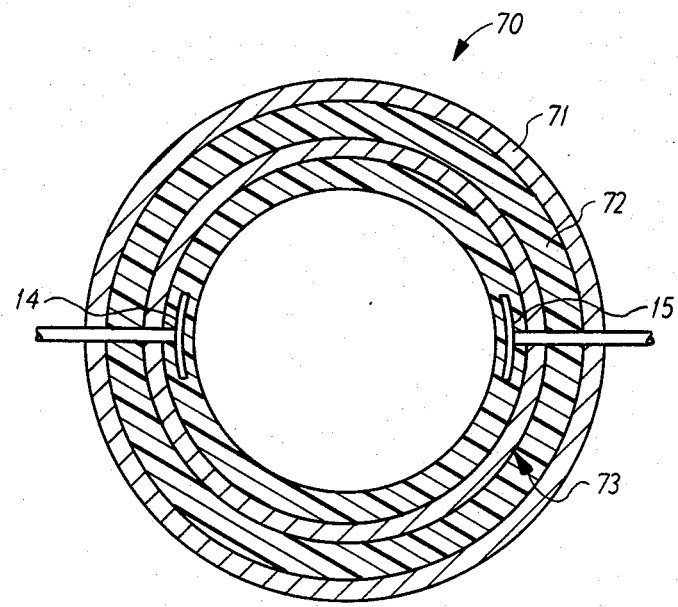
FIG. 7 is a detailed sectional view of the flow tube portion of the primary element for an alternate embodiment.

In FIG. 7 a flow tube 70 is shown which differs from that shown in FIG. 2A in that an outer metal shell 71 surrounds an inner flow tube 73 whose assembly is similar to that one in FIG. 2A. In other words, the original flow tube 12 can be thought of as having another, larger diameter metal tube concentrically positioned about itself. Between the inner tube 73 and the outer metal shell 71 an insulating layer 72 provides electrical isolation. This outer shell 71 can be electrically connected to adjacent pipework while the conducting portion of the inner tube 73 is connected to system ground discussed in connection with the FIG. 5 arrangement thereby maintaining all exposed piping at the same potential. This provides safety advantages in certain situations. In this embodiment either the inner tube 73 or the outer shell 71 may be the source of mechanical strength for the confinement of the fluid, in which case the other cylinder functions merely as an electrical shield.

Figure 8:
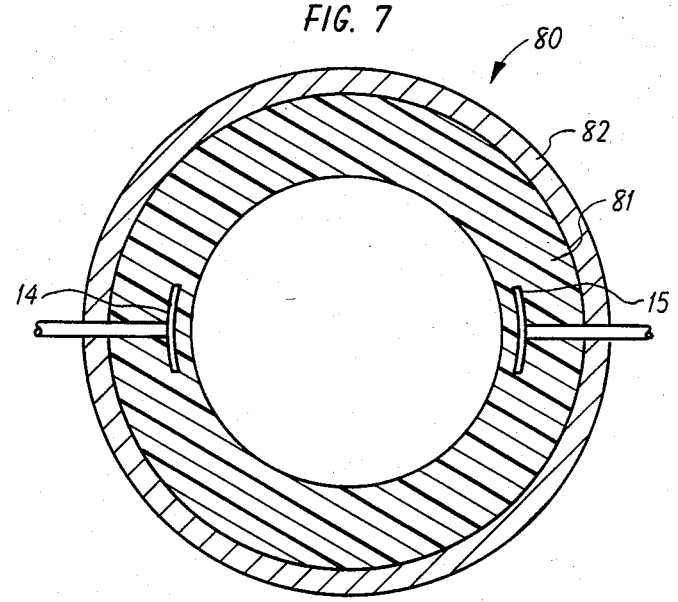
FIG. 8 is a detailed sectional view of the flow tube portion of the primary element for another alternate embodiment.

FIG. 8 shows another variation wherein a flow tube 80 is made of a dielectric material 81 rugged enough to provide the required strength for fluid containment. In this instance a metal shell 82 surrounds the dielectric material. Because the shell functions primarily as an electrical shield, it can be relatively thin metallic strip located only in the vicinity of the electrodes, nor need this strip be a continuous band around the periphery of the flow tube 80. The shell can be enclosed by a field cover (not shown) which may or may not be connected to the adjacent pipework. This embodiment is economical to manufacture as a substantial amount of metal has been removed from the primary element design. In operation, this embodiment would parallel that of the preferred embodiment in that the shell 82 surrounding the electrodes is at system ground while the adjacent piping is not.

Still other modifications are possible. For example, the wave forms and frequencies disclosed are merely exemplary, as it would be possible with minor circuitry changes to use other wave forms and frequencies. Specifically, the low frequency operation of the present system has been described in terms of U.S. standards (i.e., 60 Hz), but the principles set forth above are applicable to a wide range of frequencies. It is contemplated the system will have an operating range of from 1 Hz to 100 Hz. Furthermore, the electrode capacitance measurement has been described throughout as occurring concurrently with the flow signal measurement. However, as will be appreciated the capacitance measurement can be made at various intervals (even randomly) provided that the intervals between such measurements are short enough so that no significant deviation in capacitance occurs that would introduce unacceptable errors in the flow signal measurement. Also a microprocessor could be employed in the system to enhance processing capabilities. Additionally, the measured signals (capacitance and flow) can be digitized at any convenient point beyond the low-impedance preamplifier network.

Although several embodiments of the invention have been set forth in detail above, this is solely for the purpose of illustration as additional modifications may become apparent to those of skill in the art. Therefore, the invention is not intended to be limited by the foregoing description, but rather only by the appended claims.

We claim:

1. A magnetic flowmeter for measuring the flow rate of a flowing fluid comprising:
   a flow conduit having a dielectric portion through which a fluid whose rate of flow is to be determined is adapted to flow;
   means for generating within said dielectric portion a time varying magnetic field transverse to the direction of flow;
   electrode means capacitively coupled to the interior of said flow conduit through said dielectric portion for detecting an electrical signal induced by the intersection of the flowing fluid and said magnetic fields which is a function of flow rate; and
   low-input-impedance means having an input impedance which is less than a prescribed percentage of the capacitive impedance presented by the capacitive coupling between said electrode means and the fluid,
   and said low-input-impedance means being coupled to said electrode means for producing a current signal proportional to said induced electrical signal, whereby said current signal is indicative of the flow rate of said fluid.

2. Apparatus as claimed in claim 1 including at least one field coil for producing said time varying magnetic field, said magnetic field being established by an input voltage of predetermined frequency that generates a triangular wave form magnetic field of corresponding frequency.

3. Apparatus as claimed in claim 2 including a flux pickup coil for generating a square wave voltage proportional to the time rate of change of said magnetic field.

4. Apparatus as claimed in claim 2 wherein said predetermined frequency is in the range of about 1 to 100 cycles per second.

5. Apparatus as claimed in claim 1 wherein said low-input-impedance current signal producing means includes means to produce a flow signal current that is a square wave proportional to the time rate of change of the magnetic field.

6. Apparatus as claimed in claim 1 wherein said low-input-impedance current signal producing means includes a low-impedance amplifier network wherein the inputs of said network are clamped to about zero volts referenced to system ground, and said flow conduit similarly being tied to said system ground.

7. Apparatus as claimed in claim 6 including differential amplifier means receiving a signal from said amplifier network and producing at the output thereof a signal primarily representative of the flow rate.

8. Apparatus as claimed in claim 1 including means for measuring the capacitance between said electrode means and said flowing fluid.

9. Apparatus as claimed in claim 8 wherein said capacitance measuring means is performed concurrently with said flow rate current signal and includes means for performing said capacitance measurement while maintaining said electrode means at about zero volts.

10. Apparatus as claimed in claim 9 wherein said capacitance measuring means includes:
a low-impedance amplifier network wherein the inputs of said network are clamped to about zero volts referenced to system ground, and said flow conduit being tied to said system ground;
means for interposing a voltage source between said system ground and the conducting fluid-contact portion of the piping system adjacent said flow conduit at a frequency different from but proportional to that of said time varying magnetic field whereby a capacitance signal current proportional to the capacitance of said measurement electrodes and the time rate of change of said magnetic field is caused to flow from said measurement electrodes;
means for supplying, along with said flow rate signal, said capacitance signal current to said amplifier network for producing one signal representative of flow rate and another signal representative of the electrode capacitance; and
means for taking the ratio of said flow rate signal and said capacitance signal to produce an output signal proportional to flow rate that is independent of the time rate of change of said magnetic field and the capacitance of said measurement electrodes.

11. Apparatus as claimed in claim 1 wherein said flowmeter operates in the frequency range of about 1 to 100 cycles per second.

12. In a magnetic flowmeter of the type wherein a time varying magnetic field is caused to press through a flow conduit adapted to carry a flowing fluid whose velocity is to be measured, and having measurement electrodes positioned within said conduit within said magnetic field that are capacitively coupled to said flowing fluid whose rate of flow is to be measured by producing at said electrodes an induced electrical signal proportional to flow velocity, and including detection circuitry means for providing a flow rate signal, the improvement in such flowmetering apparatus comprising:
means for producing an on-line measurement of the capacitance between said measurement electrodes and said flowing fluid.

13. Apparatus as claimed in claim 12 wherein said on-line capacitance measurement is performed concurrently with said flow rate signal.

14. Apparatus as claimed in claim 12 including measuring means for making said capacitance measurement while holding said measurement electrodes at about zero volts relative to system ground.

15. Apparatus as claimed in claim 14 wherein said measuring means includes:
a low-impedance amplifier network wherein the inputs of said network are clamped to about zero volts referenced to system ground, and said flow conduit being tied to said system ground;
means for interposing a voltage source between said system ground and the conducting fluid-contact portion of the piping system adjacent said flow conduit at a frequency different from but proportional to that of said time varying magnetic field whereby a capacitance signal current proportional to the capacitance of said measurement electrodes and the time rate of change of said magnetic field is caused to flow from said measurement electrodes;
means for supplying, along with said flow rate signal, said capacitance signal current to said amplifier network for producing one signal representative of flow rate and another signal representative of the electrode capacitance; and
means for taking the ratio of said flow rate signal and said capacitance signal to produce an output signal proportional to flow rate that is independant of the time rate of change of said magnetic field and the capacitance of said measurement electrodes.

16. A magnetic flowmeter system of the type comprising:
a primary element including a flow conduit adapted to be inserted in a flow piping system through which a fluid whose flow rate is to be determined flows, said primary element including means for creating a time varying magnetic field passing through said fluid and electrode means capacitively coupled to said fluid for detecting an induced signal proportional to the flow rate of said fluid generated by the flowing fluid in response to said magnetic field;
a secondary element having detection circuit means for processing said induced signal to produce a corresponding output flow rate signal;
said primary element and said secondary element being conected to a first node and (referenced to a first voltage potential,) the adjacent fluid-conducting contacts of the conduits of said flow piping system at either end of said flow conduit being connected to a second node (and different potential); and
means for maintaining a prescribed voltage difference between said first and second nodes.

17. A magnetic flowmeter system of the type comprising:
a primary element including a flow conduit adapted to be inserted in a flow piping system through which a fluid whose flow rate is to be determined flows, said primary element including means for creating a time varying magnetic field passing through said fluid and electrode means coupled to said fluid for detecting an induced signal proportional to the flow rate of said fluid generated by the flowing fluid in response to said magnetic field;

a secondary element having detection circuit means for processing said induced signal to produce a corresponding output flow rate signal;

said primary element and said secondary element being referenced to a first voltage potential, the adjacent fluid-conducting contacts of the conduits of said flow piping system at either end of said flow conduit being connected to a second and different potential; and said electrode means being capacitively coupled to said fluid and including means for generating a current flow from said electrode means to produce an on-line capacitance current signal that is proportional both to the value of the capacitance between said electrode means and said fluid and a generated rate of change of voltage which itself is proportional to the rate of change of said magnetic field.

18. Apparatus as claimed in claim 17 wherein said detection circuit means includes low-input impedance means for producing a current signal indicative of the flow rate of said fluid.

19. Apparatus as claimed in claim 18 including means for combining said capacitance current and said low-input-impedance current signals to yield an output signal that is an accurate representation of fluid flow rate.

* * * * *